M. L. POIRIER & D. GUIMONT.
Hubs for Vehicles.
No. 153,275.  Patented July 21, 1874.
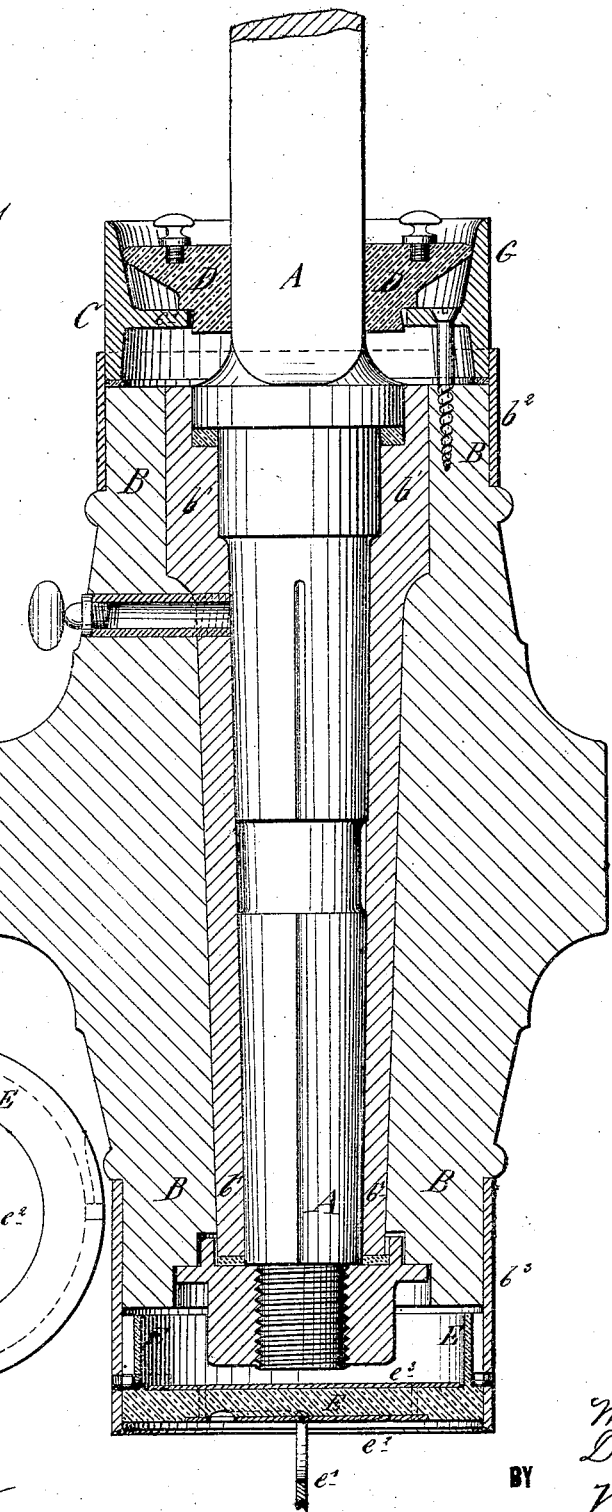
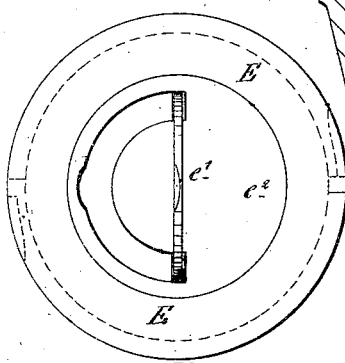
WITNESSES:
INVENTOR:
BY
ATTORNEYS.

UNITED STATES PATENT OFFICE.

MOISE L. POIRIER AND DELPHIS GUIMONT, OF GREEN BAY, WISCONSIN.

IMPROVEMENT IN HUBS FOR VEHICLES.

Specification forming part of Letters Patent No. 153,275, dated July 21, 1874; application filed May 23, 1874.

*To all whom it may concern:*

Be it known that we, MOISE L. POIRIER and DELPHIS GUIMONT, of Green Bay, in the county of Brown and State of Wisconsin, have invented a new and useful Improvement in Hub and Axle, of which the following is a specification:

Figure 1 is a longitudinal section of a hub and axle to which my improvement has been applied. Fig. 2 is an end view of the same.

Similar letters of reference indicate corresponding parts.

Our invention has for its object to furnish improved attachments for hubs and axles, which shall prevent the oil or grease from escaping from either end of the hub and running over its outer side, and also prevent sand and dust from getting in and causing the axle arm and box to wear, and which shall be simple in construction, conveniently applied, and effective in operation. The invention consists in the band made with an inwardly-projecting shoulder or flange upon the middle part of its inner surface to adapt it to be attached to the inner end of a hub; in the rubber ring or band, constructed as hereinafter described, to adapt it to be used upon an axle in connection with the band attached to the inner end of the hub; and in the cap, in combination with the band at the outer end of a hub, as hereinafter fully described.

A represents an axle-arm, and B represents a hub, which is provided with an axle-box, $b^1$, and bands $b^2$ $b^3$, in the ordinary manner. C is a band, made of cast-iron or other suitable material, and upon the middle part of the inner surface of which is formed a shoulder or flange, $c'$, to prevent the oil from flowing out, and through which are formed holes for the screws to secure it to the end of the hub. D is a rubber sleeve or band placed upon the axle-arm A, the inner end of which is so formed as to fit into the shoulder or flange $c'$ of the band C, so as to prevent the escape of oil and the entrance of sand, dust, and water. The outer part of the band D is so formed as to fit into the outer part of the band C to prevent the entrance of sand, dust, and water, and has a space between it and the flange $c'$, to serve as a trap to catch any particles that may be working their way in between the bands D and C. The band D is designed to be made open for convenience in applying it to the axle, and it may be secured in place when adjusted by a small wire. E is a cap, made of rubber or other suitable material, which fits into the band $b^3$ at the outer end of the hub B, to prevent the escape of oil and the entrance of dust and sand. The cap E may be kept in place by friction, or it may have a groove formed in its outer side to receive a pin attached to the band $b^3$, forming a fastening similar to a bayonet-clutch.

For convenience in attaching and detaching the cap E, it may have a loop or handle, $e^1$, hinged to it, which, when not required for use, shuts down into a groove or recess in said cap. The body of the cap E may be stiffened by metallic plates $e^2$ $e^3$, if desired.

Having thus described our invention, we claim as new and desire to secure by Letters Patent—

1. The combination, with axle and hub band C, of the rubber ring D, all constructed as shown and described.

2. The combination, with the band E and the hub, of cap E, constructed and applied as shown and described.

MOISE L. POIRIER.
DELPHIS GUIMONT.

Witnesses:
J. H. M. WIGMAN,
ANTONE MASSÉ.